US011906178B1

(12) United States Patent
Van Horn

(10) Patent No.: US 11,906,178 B1
(45) Date of Patent: Feb. 20, 2024

(54) HVAC VENT VALVE

(71) Applicant: Michael Dean Van Horn, Wendell, MN (US)

(72) Inventor: Michael Dean Van Horn, Wendell, MN (US)

( * ) Notice: Subject to any disclaimer, the term of this patent is extended or adjusted under 35 U.S.C. 154(b) by 343 days.

(21) Appl. No.: 16/873,790

(22) Filed: Jul. 3, 2020

(51) Int. Cl.
*F24F 11/00* (2018.01)
*F24F 7/00* (2021.01)

(52) U.S. Cl.
CPC ............ F24F 11/0001 (2013.01); F24F 7/00 (2013.01); *F24F 2011/0002* (2013.01)

(58) Field of Classification Search
CPC ... F24F 11/0001; F24F 2011/0002; F24F 7/00
USPC ........................................................ 454/255
See application file for complete search history.

(56) References Cited

U.S. PATENT DOCUMENTS 1,492,750 A * 5/1924 Rogers ..................... F24F 13/06
239/524
3,138,086 A * 6/1964 Rigterink .................. F24F 7/02
454/367
3,694,222 A * 9/1972 Pardoel ..................... F24F 7/06
119/448
3,984,947 A * 10/1976 Patry ........................ E04D 13/17
52/199

FOREIGN PATENT DOCUMENTS

JP 2011052745 A * 3/2011

* cited by examiner

*Primary Examiner* — Allen R. B. Schult
(74) *Attorney, Agent, or Firm* — Ross Brandborg

(57) ABSTRACT

An air admittance valve, particularly for use in building ventilation, to close a duct when there is at least atmospheric pressure in the building, but to open to admit atmospheric air to the building upon the occurrence of even a very small less-than-atmospheric pressure in the building. The valve has a hollow body with an upward opening to outside the building, and the low point of the body forming a basin, and a valve seat about an upward opening to inside the building. A valve member in the body above the basin opens and closes the upward opening to inside the building, and the valve member is guided in alignment with the valve seat.

1 Claim, 2 Drawing Sheets

HVAC VENT VALVE

CROSS-REFERENCE TO RELATED APPLICATIONS

Not Applicable

FEDERALLY SPONSORED RESEARCH

Not Applicable

BACKGROUND OF THE INVENTION

Field of Invention

This invention relates generally to one directional flow valve assemblies for fluid systems and particularly to assemblies which permit the ambient environment to equalize negative pressure differentials within a building while preventing positive pressure air from escaping into the ambient environment.

BACKGROUND OF THE INVENTION

For maintenance of indoor air quality, fresh air is required to replace outgoing air. This invention particularly provides improved and efficient operating characteristics which are for air admittance valve assemblies. These valve assemblies are constructed and arranged to provide an automatic one-way valve structure operative in low pressure differential environments such as in the exhaust portion of a ventilation system. The valve assemblies of the invention provide responsive and sensitive air inlet valve structures for, but not restricted to, indoor use environments to vent into buildings.

Venting a building allows make-up air to enter the building to prevent a vacuum from forming which may pull sewer gas through drain traps and into the building, draw outside air through window gaskets causing frost and mildew, and encourage the entry of radon gas into the building. Thus, ventilation systems require atmospheric make-up air to enter a building when interior air is exhausted. Building codes usually specify make-up requirements included in venting range hood and clothes dryer installations.

In the past, various means have been proposed and utilized in the art to introduce atmospheric pressure into buildings. For example, various electric and manual means exist to open vents and to sealingly hold heat and pressure within a building. However, each operating means has its advantages and disadvantages. For example, the use of an electric opener requires a motor and a power source and an electric controller. This system is costly to produce and time consuming to install. Vents requiring manual opening and closing are not sensitive to pressure change, therefore are not opened at the precise time ventilation is required and are subject to being left closed and inneffective or left open resulting in heat gain or loss. The air admittance valve of the present invention overcomes the difficulties and shortcomings of the prior art air admittance valves.

The air admittance valve of the present invention utilizes a very low-pressure seal that is gravity activated, and a basin that acts as a cold air trap. The valve assembly includes an air inlet opening and means to align the sealing membrane with respect to the valve seat of the inlet opening. The sealing membrane is comprised of a thin membrane having different configurations and which are placed in a relaxed state when sealing. The membrane provides reliable sealing at low pressure differentials. The cold air trap prevents warm outside air from entering the valve body and lifting the membrane. The air admittance valves according to the teachings of this invention permit valve opening and air admittance at negative pressure differentials.

It is the object of the present invention to provide an automatic air admittance valve which effectively and reliably permits ambient make up air under ambient pressure to enter and equalize a negative pressure differential in a building while preventing the discharge of heated or cooled air under positive pressure conditions. It is further the object of the present invention to provide a diaphragm and a basin for a gravity controlled low pressure air admittance valve assembly which is reliable and effective for venting into such buildings.

SUMMARY

It is the general object of this invention to provide an automatic, one-way air admittance valve assembly for low pressure venting into a closed system, such as a building ventilation system.

The air admittance valve is comprised of a valve body having a basin and two upward openings. One upward opening is constructed and arranged to form an opening and the other upward opening which is constructed and arranged to form an annular valve seat. A sealing membrane is provided for sealing against the sealing surface of the annular valve seat.

In one embodiment the flexible sealing member is a relaxed membrane while sealing and has an interior portion and exterior and intermediate concentric portions of a specified cross-sectional profile. The valve body further has means to guide the carrier structure to thereby position and place the sealing diaphragm onto the sealing surface of the annular valve seat. In one embodiment an intake duct is provided for guiding the flexible diaphragm against the valve seat. The carrier structure has an annular body configuration for attachment to the diaphragm.

Further provided are valve body configurations and, particularly, valve seat and cooperating flexible sealing diaphragm configurations which repeatedly seal so as to permit an air admittance valve to function in a low pressure building environment.

Further provided is to provide a trap comprising a casing having a basin and a pipe opening to the lower part of the basin, therein which remains full of cold air to form a damper.

It is an object of the invention to provide air admittance vent assemblies which are responsive at low pressures to comply with various building codes and regulatory agencies.

These and other benefits of this invention will become clear from the following description by reference to the drawings.

DRAWING—REFERENCE NUMERALS

DETAILED DESCRIPTION OF PREFERRED EMBODIMENTS

Figure 1:
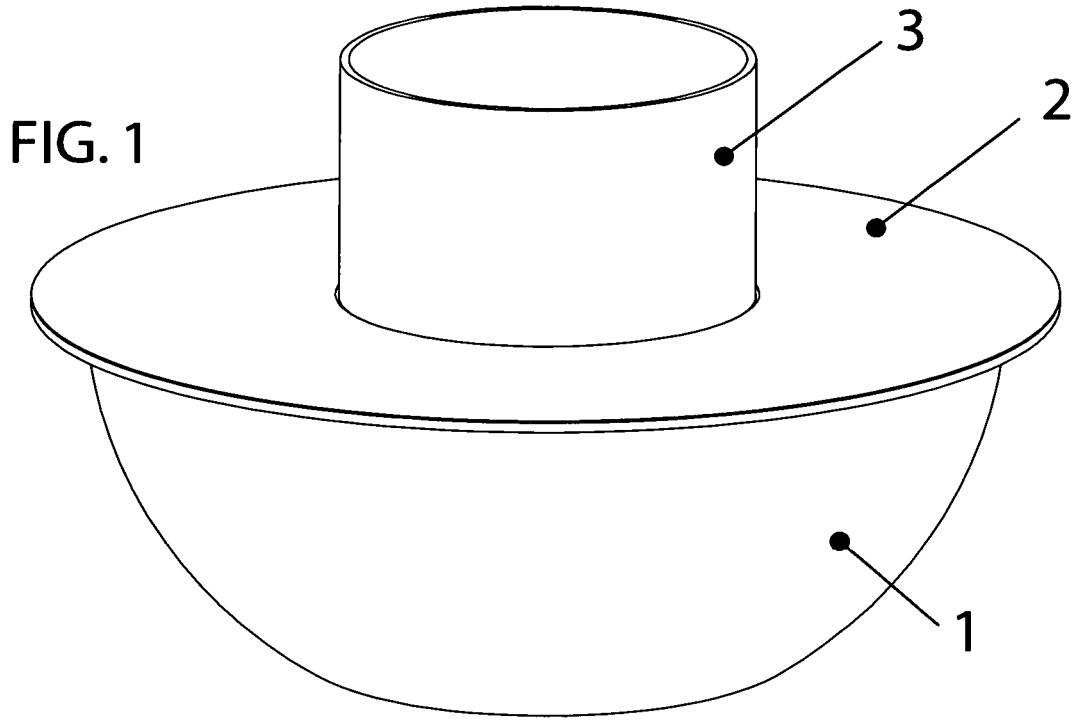
FIG. 1 is a perspective view of the invention, in closed position.
Figure 2:
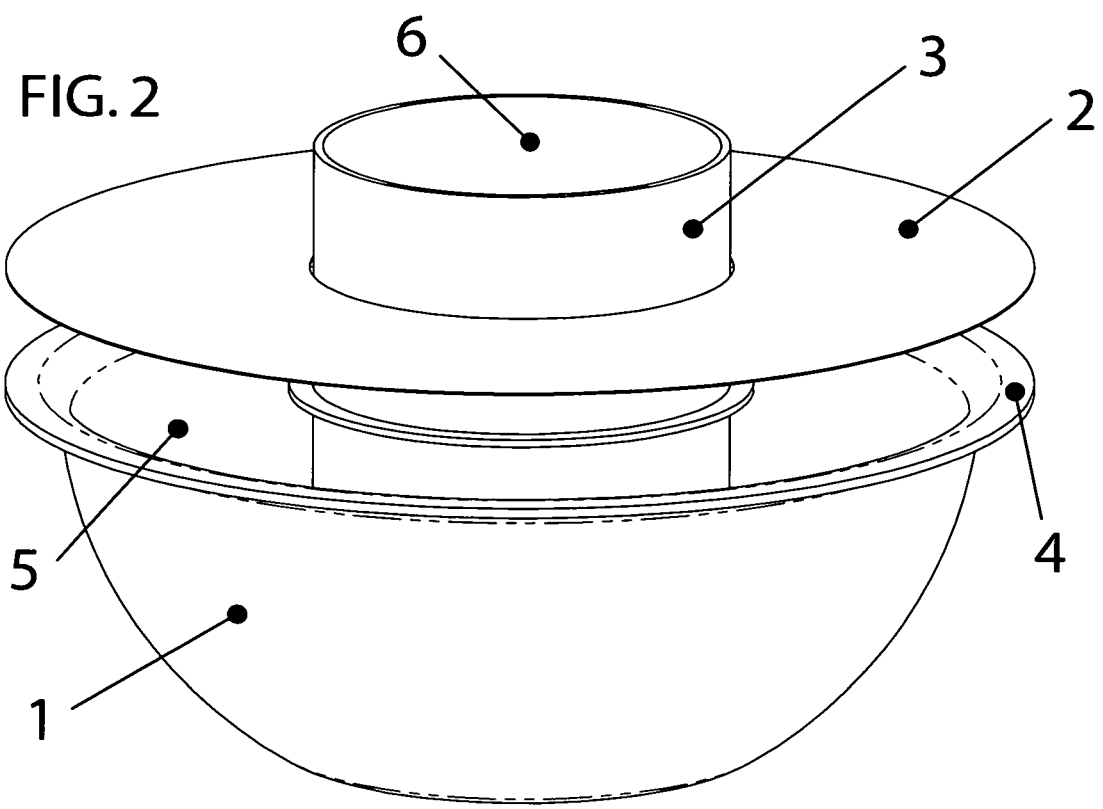
FIG. 2 is a perspective view of the invention, in open position.
Figure 3:
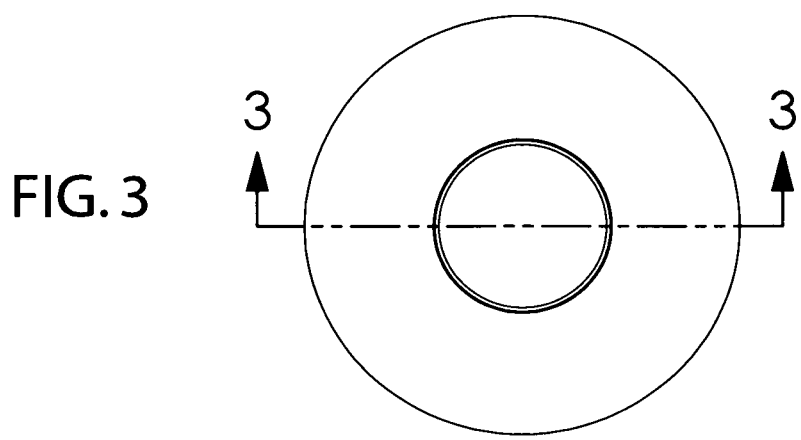
FIG. 3 is a top view of the invention.
Figure 4:
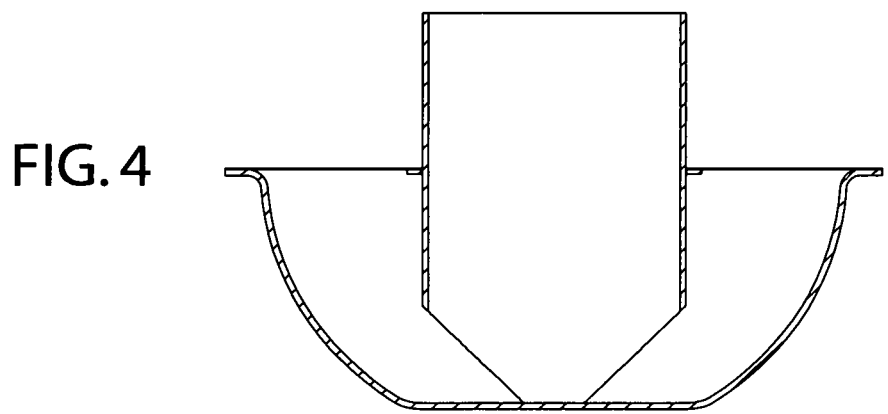
FIG. 4 is a sectional view along line 3-3 of FIG. 3, in closed position.

A preferred version of an air admittance valve is shown in FIGS. 1, 2, 3, 4 and 5. The air admittance valve has a bowl shaped body 1. The top of the valve has a protruding pipe 3 to connect to an atmospheric pressure vent pipe. The top of the valve has a movable membrane 2 to permit ambient air to enter the building during negative pressure or vacuum condition.

In operation, the air admittance valve assembly when under negative pressure in the building, the sealing membrane 2 is lifted upward from valve seat 4 thereby permitting ambient air to enter the valve basin 5 through air inlet area 6. The inlet air enters the building by passing between the membrane 2 and valve seat 4 to thereby equalize the pressure differential between the building and the ambient environment.

Figure 5:
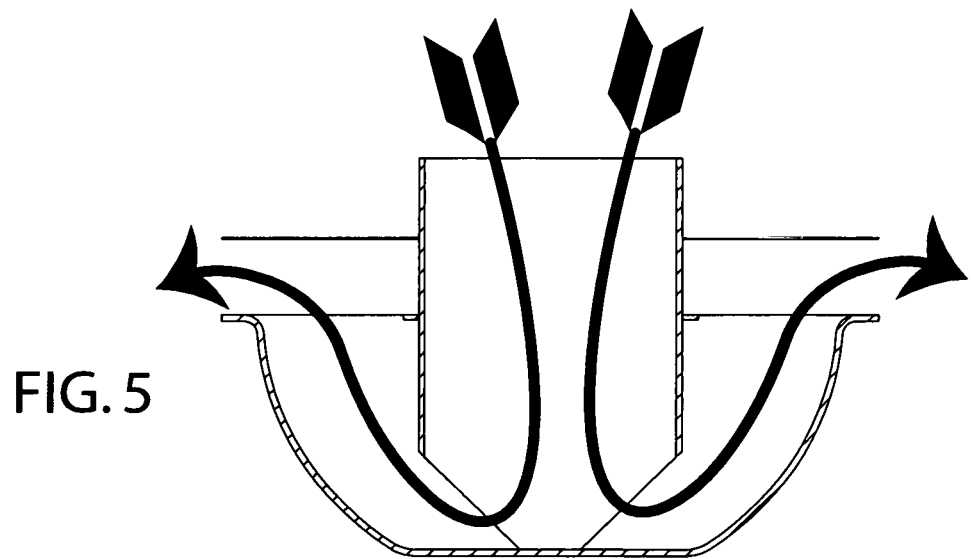
FIG. 5 is a sectional view along line 3-3 of FIG. 3, in open position.

FIG. 5, via arrows, shows the airflow in, through and out of the valve body.

As many changes are possible to the embodiments of this invention utilizing the teachings thereof, the descriptions above and the accompanying drawings should be interpreted in the illustrative and not in the limited sense.

What is claimed is:

1. A one-way valve assembly for preventing an escape of air from a building while permitting venting of ambient air into the building comprising;
   a vertical conduit with an upper side, wherein the upper side is in connection with an outside air and;
   a lower side of the vertical conduit is in communication with a cold air basin;
   the cold air basin being bowl-shaped with an open top and having walls of a height part way up the vertical conduit;
   a donut-shaped gravity-seated wall surrounding the vertical conduit and completely covering the open top of the cold air basin;
   wherein a flange extending outward from the open top and a flange extending outward from the vertical conduit form a valve seat for the gravity-seated wall in a closed position; and
   wherein the gravity-seated wall raises from the valve seat to an open position to allow the ambient air into the building.

* * * * *